United States Patent
Bednarski

(10) Patent No.: US 9,053,646 B2
(45) Date of Patent: *Jun. 9, 2015

(54) SPACER AND SUPPORT ASSEMBLY FOR WALL MOUNTED SIGNS

(71) Applicant: Gemini Incorporated, Cannon Falls, MN (US)

(72) Inventor: Robert Bednarski, Lakeville, MN (US)

(73) Assignee: Gemini, Inc., Cannon Falls, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,889

(22) Filed: Feb. 7, 2014

(65) Prior Publication Data

US 2014/0150310 A1    Jun. 5, 2014

Related U.S. Application Data

(63) Continuation of application No. 13/618,667, filed on Sep. 14, 2012, now Pat. No. 8,695,253.

(51) Int. Cl.
| | |
|---|---|
| *A47G 1/16* | (2006.01) |
| *G09F 7/18* | (2006.01) |
| *G09F 7/20* | (2006.01) |
| *F16B 35/00* | (2006.01) |

(52) U.S. Cl.
CPC .................. *G09F 7/18* (2013.01); *Y10T 403/56* (2015.01); *G09F 7/20* (2013.01); *F16B 35/005* (2013.01)

(58) Field of Classification Search
CPC .................. G09F 7/18; G09F 15/0012; G09F 2007/1882; A47F 5/08; A47G 29/1209
See application file for complete search history.

(56) References Cited

U.S. PATENT DOCUMENTS

| | | | |
|---|---|---|---|
| 1,599,189 A | 9/1926 | Smith | |
| 1,864,080 A | 6/1932 | Madge | |
| 3,333,555 A | 8/1967 | Kapnek | |
| 3,741,594 A | 6/1973 | Ostling | |
| 3,876,318 A | 4/1975 | Crispell | |
| 3,987,568 A | 10/1976 | Rosenberg | |
| 4,108,560 A | 8/1978 | Minogue | |
| 4,161,834 A | 7/1979 | Hendricks, Jr. | |
| 4,169,308 A | 10/1979 | Minogue | |
| 4,540,322 A | 9/1985 | Coffia | |
| 4,611,943 A * | 9/1986 | Bengtsson | 403/22 |
| 4,786,201 A | 11/1988 | Huetter et al. | |
| 5,181,817 A * | 1/1993 | Anderson | 411/369 |
| 5,326,061 A | 7/1994 | Hamilton | |
| 5,630,687 A * | 5/1997 | Robinson | 411/372.6 |
| 5,769,583 A | 6/1998 | Girbinger | |
| 6,520,704 B1 | 2/2003 | Vidmar et al. | |
| 6,557,285 B2 * | 5/2003 | Walsh, Jr. | 40/617 |

(Continued)

*Primary Examiner* — Shin Kim
(74) *Attorney, Agent, or Firm* — Haugen Law Firm PLLP

(57) ABSTRACT

A spacer assembly for mounting a sign to a wall includes proximal and distal spacer members. The proximal spacer member includes a barrel and a coaxial coupling shaft extended distally from the barrel. The distal spacer member includes a distal barrel and a recess extending into the barrel and sized to slidably and rotatably receive the coupling shaft. A threaded stud extends proximally from the proximal barrel, and a distal threaded stud extends distally from the distal barrel. Each stud is removably threaded into its associate barrel. The distal member barrel supports a radially oriented set screw, movable toward and away from an advanced position in which the screw engages the coupling shaft to integrally secure the barrels. The spacer assembly allows the sign to be detached from the wall while leaving in place the studs coupled to the sign and wall.

20 Claims, 4 Drawing Sheets

(56) References Cited

U.S. PATENT DOCUMENTS

| | | |
|---|---|---|
| 7,506,464 B2 | 3/2009 | Tarter et al. |
| 8,083,214 B2 | 12/2011 | DeRogatis et al. |
| 8,371,054 B2 | 2/2013 | Casterline |
| 2003/0038222 A1 | 2/2003 | Holmes |

* cited by examiner

SPACER AND SUPPORT ASSEMBLY FOR WALL MOUNTED SIGNS

CROSS-REFERENCE TO RELATED APPLICATIONS

The present application is a continuation of pending U.S. patent application Ser. No. 13/618,667, filed on Sep. 14, 2012 and entitled "SPACER AND SUPPORT ASSEMBLY FOR WALL MOUNTED SIGNS", the content of which being incorporated herein in its entirety.

BACKGROUND OF THE INVENTION

The present invention relates to systems for mounting a sign or other display object in fixed and spaced apart relation to a wall or other supporting object, and more particularly to systems that employ spacing assemblies formed of releasably coupled spacing elements.

Since ancient times, signs have been a fundamental form of communication. They convey an almost unlimited variety of messages with such wide ranging purposes as advertising products and services; providing instructions and directions; identifying government offices, retail establishments and other locations open to the public; and designating locations where entry is discouraged or forbidden.

A feature common to these disparate uses is the desire for a highly visible, attractive sign with an impact such that its message is more likely to be noticed and retained by the observer. This feature is particularly important in commercial environments, where a sign advertising a product or identifying a business location frequently competes for attention with other signs.

With this in mind, users of signs and sign mounting systems continually search for alternative approaches to enhance visibility and visual impact. One approach, especially suitable for signs supported by walls or other upright structures, is to mount a sign or its parts (e.g. individual letters) spaced apart horizontally from the wall or other vertical support. This gives the sign, or letters, a free standing or floating appearance that can be aesthetically pleasing as well as dramatic, drawing attention to the sign.

FIG. 1 illustrates a conventional approach to mounting a display object such as a sign or an alphanumeric character to a wall, to achieve a desired horizontal spacing from the wall. The display object, e.g. a letter 1, includes a shell or "can" 2 and a back panel 3 mounted to the can through several brackets, one of which is shown at 4. A screw 5 secures the bracket to the can. Bracket 4 includes a horizontal, internally threaded opening 6.

A plurality of mounting devices 7, each including a threaded stud 8 and a tubular spacer 9, are used to mount can 2 horizontally spaced apart from a vertical surface 10 of a wall 11. A forward end 12 of each stud is threaded into an associated one of bracket openings 6 to secure the studs integrally with respect to the can. A series of horizontal holes, one shown at 13, are drilled into wall 11 in a pattern to receive rearward ends 14 of the studs. The holes, larger in diameter than the studs and smaller in diameter than the tubular spacers, are filled with a silicone adhesive.

With the studs secure in their respective brackets and surrounded by the tubular spacers, the exposed rearward ends 14 of the studs are inserted simultaneously into their associated holes 13. The spacers simultaneously abut back panel 3 and wall 11, to set the desired horizontal spacing. Can 2 is supported by external means until the silicone is cured, at which point the external support is removed.

This approach satisfactorily supports the display object, yet presents problems when a user wishes to remove the display object for maintenance, cleaning or repair. Screws 5 can be removed to separate can 2 from back panel 3. The back panel, however, cannot be removed from wall 11 without pulling studs 8 out of their associated receptacles 13, destroying the silicone bonds.

In some designs, brackets 4 are mounted internally of the can using adhesives, eliminating screws 5. Users with aesthetic concerns are pleased with this approach, yet it compounds the above problem, in that a user can not remove can 2 without removing the entire sign, again destroying the silicone bonds.

Alternative fasteners and spacers are known in the art. U.S. Pat. No. 4,161,834 (Hendricks, Jr.) discloses a fastener for mounting signs. An elongate threaded member is surrounded by a spacer and a retainer. A radial screw through the retainer abuts threaded member to secure the retainer. U.S. Pat. No. 7,506,464 (Tarter et al.) concerns a sign display fastener. The fastener includes a threaded front portion, a rear portion with engagement features, and an intermediate spacer. The threaded front portion is secured to a sign, and the rear portion is inserted into a bore in the wall and fixed in the bore with adhesives.

U.S. Pat. Nos. 4,169,308 and 4,108,560 (both to Minogue) disclose a fastener including a wood screw having a head with machine screw threads, an internally and externally threaded boss, an attachment member (e.g. a screw or nail), and a female member. The boss is threaded onto the wood screw which then is threaded into a sign. The attachment member is used to secure the female member to a wall. Then, the female member is threaded onto the boss to mount the sign with respect to the wall.

The forgoing devices, while useful and suited to their particular environments, do not satisfactorily address the problems experienced with the conventional mounting approach. The fasteners disclosed in the Minogue patents are formed with releasably coupled segments that can remain coupled to the sign and wall, respectively. However, any attempt to remove a previously mounted sign is complicated by the threaded coupling of the fastener sections. This requires a wrench or other tool to individually manipulate the female member of each fastener, and would appear to require an approach in which the fasteners must be decoupled individually, yet together in incremental stages.

Accordingly, the present invention has several aspects, each directed to one or more of the following objects:

to provide a spacing and supporting assembly composed of releasably and slidably coupled spacing components to mount a display object at a predetermined axial spacing distance from a supporting object;

to provide a spacing device with separate spacing sections movable axially into and out of a releasable engagement in which the spacing sections are rotatable relative to one another without changing their relative axial locations;

to provide a spacing and supporting assembly comprised of releasably coupled sections, configured for use in lieu of a single stud and coaxial tubular spacer without requiring any modification to a supporting object or the display object it supports; and to provide a system of supporting and spacing assemblies composed of medial spacing sections, and threaded studs adapted for interchangeable attachment to spacing sections of different axial lengths.

SUMMARY OF THE INVENTION

To achieve these and other objects, there is provided an apparatus for releasably mounting a display object in spaced apart relation to a supporting object. A first spacer member of the apparatus comprises a longitudinally oriented first spacer member body having opposite first proximal and first distal ends, a substantially flat and transverse proximal alignment surface at the first proximal end, an elongate coupling shaft extended distally away from the first distal end, and a first coupling feature integral with the coupling shaft. The apparatus includes a second spacer member comprising a longitudinally oriented second spacer member body having opposite second proximal and second distal ends, a substantially flat and transverse distal alignment surface at the second distal end, and an elongate recess open at the second proximal end and extended distally from the second proximal end into the second spacer member body. A second coupling feature is mounted to the second spacer member for movement between an advanced position and a retracted position. The coupling shaft is insertable slidably and distally into the recess to coaxially align the first and second spacer members and thereby form a spacer assembly with the proximal alignment surface and the distal alignment surface at opposite ends of the assembly. The second coupling feature is movable to the advanced position with the first and second spacer members so aligned, to releasably engage the first coupling feature and thereby longitudinally fix the second spacer member relative to the first spacer member. This fixes a longitudinal spacing between the proximal and distal alignment surfaces. The second coupling feature further is retractable from the advanced position to disengage the first and second coupling features and thereby allow a proximal withdrawal of the coupling shaft from the recess. A first anchoring feature extends proximally from the proximal alignment surface for securing the first spacer member to a display object with the proximal alignment surface contiguous with a first reference surface of the display object. A second anchoring feature extends distally from the distal alignment surface for securing the second spacer member to a supporting object with the distal alignment surface contiguous with a second reference surface of the supporting object.

The slidable coupling of the spacer members is particularly advantageous when the need arises to remove a wall-mounted sign for cleaning, inspection, or repair. The sign can be removed by decoupling the spacer assemblies without disturbing the attachments of the first spacer members to the sign, or the attachments of the second spacer members to the wall. This is accomplished by retracting all of the second coupling features, then proximally moving the sign relative to the wall, to simultaneously withdraw all of the coupling shafts from their respective recesses.

Following inspection, the sign is reinstalled by positioning the sign to align the first and second spacer members, then by moving the sign distally toward the wall to simultaneously insert the coupling shafts into their associated recesses. With the coupling shafts inserted, the second coupling features can be advanced to integrally couple the pairs of spacer members and reestablish the desired longitudinal spacing from the wall.

The second coupling feature, when moved into the advanced position to engage the first coupling feature, integrally secures the first and second spacer members, and simultaneously fixes the longitudinal spacing between the first and second alignment surfaces. In preferred versions of the apparatus, the second spacing member body is provided with an aperture. The aperture is open to the recess and extends radially outwardly from the recess to an exterior surface of the second spacing member body. The second coupling feature comprises a detent mounted in the aperture and movable radially, toward and away from the advanced position. The first coupling feature advantageously has a V-shaped profile, so that the detent, as it is moved radially into an engagement with the first coupling feature, tends to move the coupling shaft into the desired alignment for fixing the longitudinal spacing.

More preferably, the first coupling feature comprises a circumferential grove formed along the coupling shaft, with a V-shaped profile in radial-axial planes bisecting the coupling shaft. In this arrangement, the detent can be advanced to place its radially inward end inside the grove, yet short of engaging the coupling shaft. This substantially sets the longitudinal position of the second spacer member relative to the first spacer member, yet permits the second spacer member to rotate relative to the first spacer member. This arrangement allows the user to set the angular position of the second spacer member for convenient access to the detent, before fully advancing the detent to integrally couple the spacer members.

The preferred detent is a screw, threadedly coupled to the second spacer member body through internal threads formed along the aperture.

Another aspect of the invention is a rotationally adjustable spacer assembly. A first spacer member of the assembly comprises a longitudinally oriented first spacer member body having opposite first proximal and first distal ends, a substantially flat and transverse proximal alignment surface at the first proximal end, and an elongate coupling shaft extended distally away from the first distal end. A second spacer member of the assembly comprises a longitudinally oriented second spacer member body having opposite second proximal and second distal ends, a substantially flat and transverse distal alignment surface at the second distal end, and an elongate recess open at the second proximal end and extended distally from the second proximal end into the second spacer member body. A coupling feature is mounted to the second spacer member for movement between advanced and retracted positions. The coupling shaft is insertable slidably and distally into the recess to coaxially align the first and second spacer members to form a spacer assembly with the proximal alignment surface and the distal alignment surface at opposite ends of the assembly. When disposed in the recesses, the coupling shaft is free to rotate about a longitudinal axis relative to the second spacer member body. The coupling feature is movable to the advanced position with the first and second spacer members so aligned, to releasably engage the first spacer member and thereby longitudinally fix the second spacer member relative to the first spacer member. This fixes a longitudinal spacing between the proximal and distal alignment surfaces. The coupling feature further is retractable from the advanced position to disengage the coupling feature from the first spacer member and thereby allow a proximal withdrawal of the coupling shaft from the recess. A first anchoring feature extends proximally from the first alignment surface for securing the first spacer member to a display object with the proximal alignment surface contiguous with a first reference surface of the display object. A second anchoring feature extends distally from the distal alignment surface for securing the second spacer member to a supporting object with the distal alignment surface contiguous with a second reference surface of the supporting object.

The advantages of slidably coupled spacer members, discussed above, are augmented when the spacer members are rotatably coupled as well. This preferably is achieved by forming the coupling shaft and recess with circular profiles in transverse planes. The primary advantage of this feature is that the user can adjust the rotational or angular position of the second spacer member relative to the first spacer member, while maintaining the desired longitudinal spacing between the alignment surfaces. With the first spacer members installed into the sign, this feature allows selective rotation of each second spacing member for convenient access to its coupling feature.

A further aspect of the present invention is a spacer assembly for supporting a sign. A first spacer member of the spacer assembly comprises a longitudinally oriented first spacer member body having opposite first proximal and first distal ends, a substantially flat and transverse proximal alignment surface at the first proximal end, a first mating surface at the first distal end, and an elongate coupling shaft extended distally away from the first distal end. A second spacer member of the assembly comprises a longitudinally oriented second spacer member body having opposite second proximal and second distal ends, a substantially flat and transverse distal alignment surface at the second distal end, a second mating surface at the second proximal end, and an elongate recess open at the second proximal end and extended distally from the second proximal end into the second spacer member body. A coupling feature is mounted to the second spacer member for substantially radial movement between advanced and retracted positions. The coupling shaft is insertable slidably and distally into the recess to bring the first and second mating surfaces into a contiguous engagement, coaxially aligning first and second spacer members to form a spacer assembly with the proximal alignment surface and the distal alignment surface at opposite ends of the assembly. The coupling feature is movable to the advanced position with the first and second spacer members so aligned, releasably engaging the first spacer member to longitudinally and releasably fix the second spacer member relative to the first spacer member and thus fix a longitudinal spacing between the proximal and distal alignment surfaces. A first anchoring feature is removably mounted to the first spacing member body and extends proximally from the first alignment surface for securing the first spacer member to a display object with the proximal alignment surface contiguous with a first reference surface of the display object. A second anchoring feature is removably mounted to the second spacer member body and extends distally from the distal alignment surface for securing the second spacer member to a supporting object with the distal alignment surface contiguous with a second reference surface of the supporting object.

As noted above, the releasable coupling of the first and second spacer members affords convenient removal of a wall-mounted sign from the wall, even when multiple spacer assemblies are employed to support the sign. Removal is accomplished without disturbing the connection of the first spacer members to the sign, and without disturbing the connection of the second spacer members to the wall.

The removable mounting of the anchoring features to the spacing member bodies allows the user to remove a given spacer member body from the sign without disturbing the coupling of the anchoring feature with the sign. Likewise, the user can remove a given spacer member body from the wall without disturbing the coupling of the anchoring feature with the wall. This is particularly advantageous given that the second anchoring feature typically is a threaded stud mounted to the wall through a silicone adhesive. Thus, the second spacing member body is removable without destroying the silicone bond.

Consequently, spacer member bodies can be detached from the sign or wall for inspection, cleaning or repair while the associated studs or other anchoring features remain integrally coupled. An added advantage is that a given spacer member body or assembly of spacer member bodies can be replaced with an alternative of a different length to selectively adjust the longitudinal spacing, again without disturbing the anchoring features.

Thus in accordance with the present invention, multiple spacing and supporting assemblies are employed to mount a sign or other display object in spaced apart relation to a wall or other supporting object. Each of the assemblies is formed of two releasably coupled members, one attached to the sign and the other attached to the wall. As a result, the sign can be removed from the wall and reattached by decoupling and recoupling the spacer members, without disturbing the connections of the spacer members to the sign and wall, respectively. The spacer members of each assembly are slidably coupled, and further may be rotatably coupled for convenient adjustment of the angular position of each spacer member while maintaining its desired longitudinal position. If desired, threaded studs or other suitable anchoring features can be removably attached to the spacer members, to allow interchangeable coupling and substitution of spacer members of different lengths.

IN THE DRAWINGS

For a further understanding of the above and other features and advantages, reference is made to the following detailed description and to the drawings, in which.

DETAILED DESCRIPTION OF THE PREFERRED EMBODIMENTS

Figure 2:
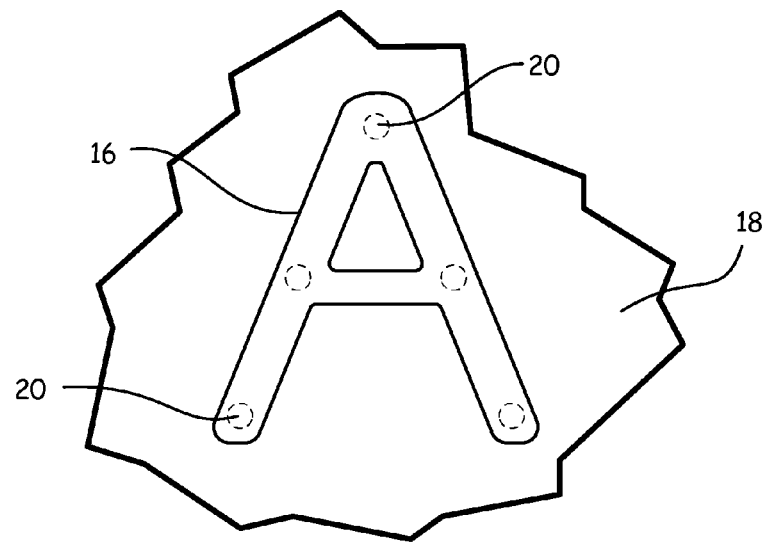
FIG. 2 is a frontal elevation of a display object in the form of the letter "A" mounted in spaced apart relation to a supporting wall in accordance with the present invention.

Turning now to the drawings, there is shown in FIG. 2 a display object or letter 16 mounted to a supporting object, in this case a wall 18. Broken lines at 20 indicate several locations at which spacer assemblies support letter 16 in front of wall 18, spaced apart forwardly from the wall.

Display object 16 may be a sign, a symbol other than an alphanumeric character, or a sculpture, although the latter might have an irregular (non-planar) back surface requiring spacer assemblies of different lengths. Alternatively to wall 18, the supporting object may be a post or other structure with a vertical surface, or a base having a horizontal or inclined surface where spacer assemblies support a display object spaced apart in a vertical or other non-horizontal direction from the supporting object.

Figure 3:
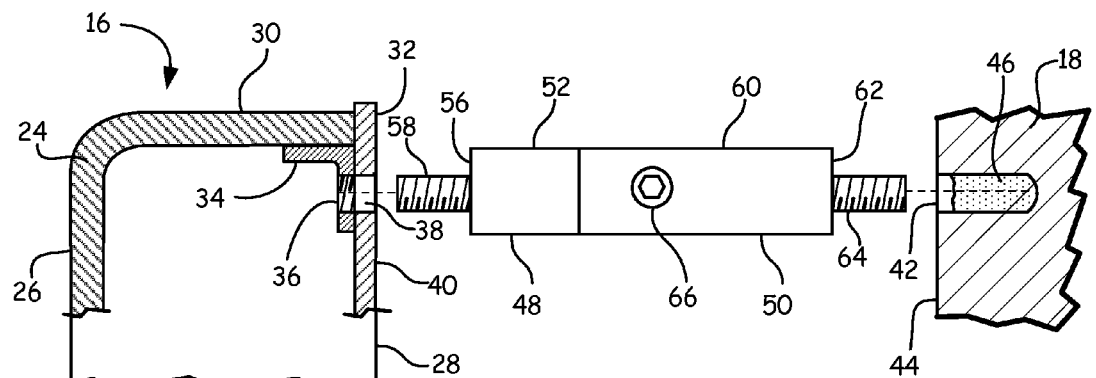
FIG. 3 is an enlarged partial side elevation partially in section, showing one of several spacer assemblies that support the letter with respect to the wall.

FIG. 3 is an enlarged partial side view of the letter and wall, showing a spacer assembly 22 disconnected from letter 16 and wall 18. The horizontal distance between the letter and wall is shown larger to illustrate the complete spacer assembly.

Letter 16 includes a shell or can 24 formed as the letter "A," with a vertical oriented front wall 26 and rear edge 28, and a side wall 30. A planar, vertically oriented back panel 32 is attached to can 24 by a plurality of brackets, one of which is shown at 34. Brackets 34 are adhered to an inside surface of side wall 30, and consequently are not visible from outside of the can. An internally threaded opening 36 is formed through the bracket. An opening 38 through back panel 32 is coaxial with opening 36. Back panel 32 has a planar, vertically oriented rear surface 40.

Wall 18 has a planar, vertically oriented front surface 44. A plurality of holes, one of which is shown at 42, are drilled or otherwise formed in wall 18. Holes 42 are open at front surface 44, and extend rearwardly into the wall. Each of the holes is filled with a silicone adhesive 46.

For supporting letter 16 in front of wall 18, spacer assembly 22 includes a front spacer member 48 and a rear spacer member 50 releasably joined to the front spacer member. More generally in terms of their proximity to the display object, the front and rear spacer members can be thought of as proximal and distal spacer members, respectively.

Proximal spacer member 48 has a cylindrical proximal barrel or spacer member body 52 which is cylindrical and disposed on a longitudinal axis 54. Body 52 has a flat, transverse proximal end surface 56 which functions as a proximal alignment surface of the spacer assembly. An elongate threaded proximal stud 58, also disposed on the longitudinal axis 54, extends proximally away from proximal end surface 56.

Distal spacer member 50 has a cylindrical distal barrel or spacer member body 60 with a flat, transverse distal end surface 62 that functions as a distal alignment surface of the spacer assembly. An elongate threaded distal stud 64 extends distally from distal end surface 64. Barrel 60 and stud 64 are disposed on longitudinal axis 54.

A set screw 66, threadedly engaged with distal barrel 60, is operable to integrally fix barrels 52 and 60 with respect to each other as shown in FIG. 3. Fixation of the barrels sets a longitudinal spacing distance between alignment surfaces 56 and 62. Accordingly, when proximal alignment surface 56 is contiguous with rear surface 40 of the back panel, and distal alignment surface 62 is contiguous with front surface 44 of the wall, spacer assembly 22 sets the desired horizontal spacing between the display object and the wall.

Figure 4:
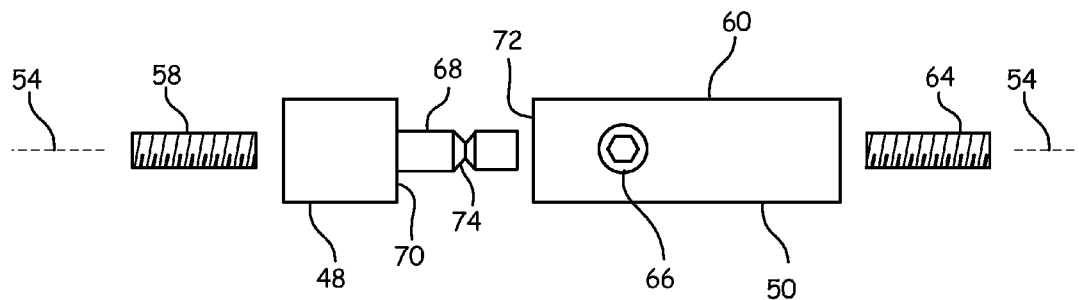
FIG. 4 is an exploded parts view of the spacer assembly.

As seen in FIG. 4, proximal stud 58 is externally threaded over its entire length. This permits the stud to be removably coupled to proximal barrel 52. Similarly, distal stud 64 is threaded over its entire length such that a proximal end region of the stud threadedly engagable with distal barrel 60.

Proximal spacer member 48 includes a coupling shaft 68 extending distally away from a transverse distal surface 70 of barrel 52. The coupling shaft is insertable into a recess formed in distal barrel 60, to bring distal surface 70 into contiguous engagement with a transverse proximal surface 72 of barrel 60. A circumferential groove 74 is formed along the coupling shaft. Groove 74 has a V-shaped profile in radial-axial planes, i.e. planes that bisect the longitudinal axis.

Figure 5:
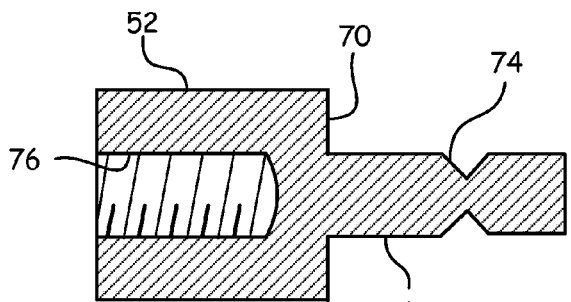
FIG. 5 is a side sectional view of a proximal spacer member of the assembly.
Figure 6:
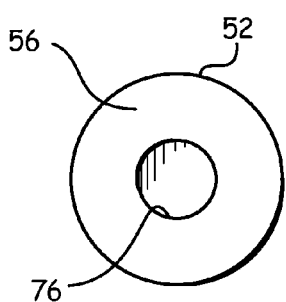
FIG. 6 is a frontal elevation of the proximal spacer member.
Figure 7:
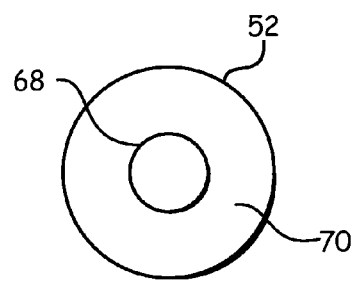
FIG. 7 is a rear elevation of the proximal spacer member.

In FIG. 5, proximal barrel 52 is shown in section to reveal an internally threaded opening 76 that extends distally into the barrel from proximal surface 56. Opening 76 threadedly and removably receives the distal end portion of stud 58. As seen in FIGS. 6 and 7, opening 76 and coupling shaft 68 are coaxial with proximal barrel 52, and have circular transverse profiles.

Figure 8:
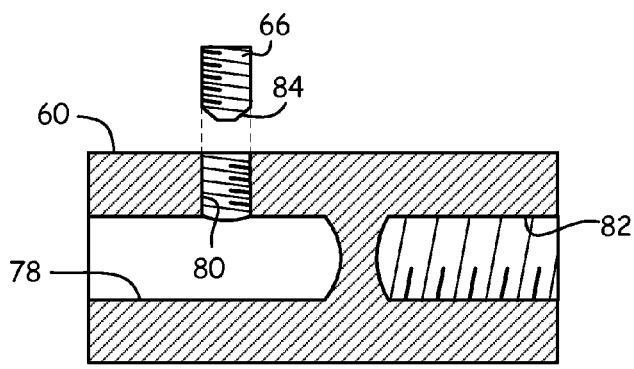
FIG. 8 is a side sectional view of a distal spacer member of the spacer assembly.
Figure 9:
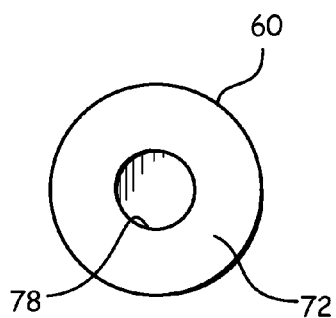
FIGS. 9 and 10 are frontal and rear elevations of the distal spacer member, respectively.

In FIG. 8, distal barrel 60 is shown in section to reveal a recess 78 extending distally into the barrel from proximal surface 72. As seen in FIG. 9, recess 78 has a circular transverse profile and is coaxial with barrel 60. Thus, with the exception of groove 74, the profiles of recess 78 and coupling shaft 68 conform to one another. The respective radii of the coupling shaft and recess are closely matched. In one version of the spacer assembly, a nominal diameter of the recess exceeds the coupling shaft diameter by 0.003 inches.

This produces several favorable results. First, the coupling shaft is conveniently slidable into and out of the recess. Second, the close correspondence of the coupling shaft and recess prevents any substantial transverse movement of spacer members 48 and 50 relative to one another when the coupling shaft is inserted into the recess. As a result, the strength and stability of spacer assembly 22 compare well with the strength and stability of the conventional stud and spacing tube shown in FIG. 1. Moreover, the coupling shaft 68 may preferably have a diameter that is larger than the root (minor) diameter of conventionally-employed threaded studs, such that the coupling shaft 68 may provide spacer assembly 22 with superior strength, as compared to conventional threaded studs.

Due to the circular transverse profiles of coupling shaft 68 and recess 78, the coupling shaft is rotatable relative to barrel 60 when fully inserted into the recess. Accordingly, barrel 60 is rotatable relative to barrel 52. The capacity to rotate distal spacer member 50 relative to proximal spacer 48 without changing their relative longitudinal locations, allows the user to select an annular position of barrel 60 corresponding to convenient access to set screw 66.

With further reference to FIG. 8, a radial aperture 80 extends from recess 78 to the exterior of distal barrel 60. Aperture 80 is internally threaded to accommodate set screw 66. When coupling shaft 68 is fully inserted into recess 78, groove 74 and aperture 80 are axially (longitudinally) aligned.

Figure 10:
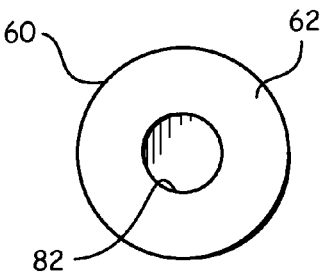

A longitudinal opening 82 extends proximally inward from distal surface 62 of barrel 60. Longitudinal opening 82 is internally threaded to accommodate a removable mounting of stud 64 to the barrel. As seen in FIG. 10, longitudinal opening 82 is coaxial with barrel 60.

As shown in FIG. 8, set screw 66 can be provided with a cup point 84 that interacts with circumferential groove 74, tending to longitudinally center the groove with respect to the set screw as the set screw is advanced inwardly toward the coupling shaft. This feature, in combination with the contiguous engagement of surfaces 70 and 72, sets the longitudinal spacing distance between alignment surfaces 56 and 62. If desired, a nylon patch (not illustrated) can be provided in aperture 80 between the external threads of the set screw and the internal threads of the aperture, to aid in maintaining the set screw in the fully advanced position.

Set screw 66 is movable radially in aperture 80, between an advanced position in which the set screw engages coupling shaft 68 at groove 74 to integrally secure barrels 52 and 60, and a radially outward retracted position that allows the coupling shaft to be withdrawn from the recess. A slight retraction of set screw 66 from the advanced position allows rotation of the coupling shaft while point 84 of the set screw remains in groove 74 to prevent withdrawal of the shaft from the recess, and thus substantially maintain the longitudinal spacing between alignment surfaces 56 and 62.

As to materials, the barrels and studs preferably are formed of anodized aluminum, and the set screw preferably is stainless steel.

Figure 1:
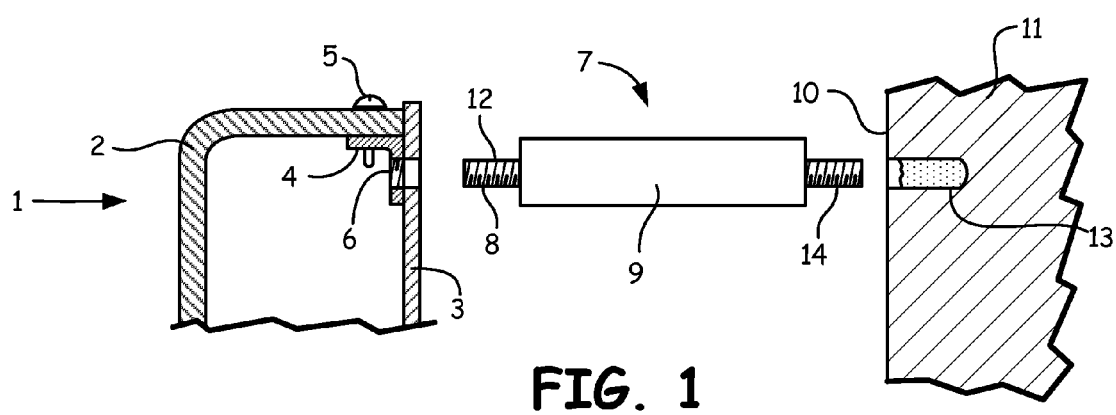
FIG. 1 illustrates a conventional approach to mounting a sign or other display object spaced apart from a supporting wall.

Assemblies 22 are used to mount an alphanumeric character, sign, or other display object generally in the same manner as the single stud/tubular spacer device shown in FIG. 1. A typical installation of a sign or other display object requires several of the spacer assemblies. The assemblies are installed in concert. For each assembly, the process proceeds as follows:

With stud and proximal spacer barrel 52 threadedly coupled as shown in FIG. 3, the exposed proximal end portion of stud 58 is threaded into opening 36 of bracket 34 until proximal alignment surface 56 of barrel 52 engages surface 40 of back panel 32. Surface 40 acts as a reference surface to locate the proximal barrel. At this stage, barrel 52 preferably is disconnected from distal barrel 60, although this is not critical.

Next, distal barrel 60 is moved proximally into engagement with proximal barrel 52, causing coupling shaft 68 to enter recess 78, causing mating surfaces 70 and 72 to engage, and further bringing aperture 80 and set screw 66 into longitudinal alignment with circumferential groove 74 of the coupling shaft.

At this point, set screw 66 is turned to advance it radially inwardly toward engagement with coupling shaft 68. If desired, the set screw can be advanced until it is just short of the completely advanced position, with point 84 of the screw disposed within the circumferential groove to secure the desired longitudinal position of the barrels while allowing their relative rotation. The rotational freedom allows the user to selectively adjust the angular position of barrel 60 for convenient access to set screw 66.

At this stage, the set screw is moved to the advanced position, in which set screw 66 engages coupling shaft 68 to fix barrel 60 integrally with respect to barrel 52. It has been found advantageous to form set screw 66 with a hexagonal feature at its head, so that the set screw can be advanced and retracted with a hexagonal key or Allen wrench.

The foregoing steps are repeated to install a suitable number of the assemblies into the display object. All of the installed assemblies are parallel, extending distally away from back panel 32.

Next, a series of oversized holes are drilled into the wall, base, or other supporting object. The holes extend distally into the supporting object, arranged in a pattern to associate each hole with one of the assemblies to receive a distal end portion of stud 64. Each of the holes is filled with a silicone adhesive.

At this point the display object is aligned with the supporting object to position each of studs 64 adjacent its associated hole. The display object is moved distally to simultaneously insert the distal studs into their associated holes, until distal alignment surface 62 of each barrel 60 engages the surface of the wall or other supporting object adjacent the associated hole. The surface of the wall functions as a reference surface to establish the position of each assembly, thus to establish the desired spacing of the display object from the wall.

Following positioning, the sign or other display object is supported by an external structure (not shown) until the adhesive cures, at which point the external structure can be removed. The spacer assemblies accordingly support the display object and set the desired spacing of the display object from the wall or other supporting structure. As to each spacer assembly, the longitudinal distance between the proximal and distal alignment surfaces determines the desired spacing. The alignment surfaces engage their associated reference surfaces to support the display object at the desired spacing.

A feature of the present invention resides in the ease with which a previously installed sign or other display object can be removed for inspection, cleaning, or repair. The display object is detached from a wall or other supporting object, simply by retracting set screws 66 of the assemblies, to allow a proximal, sliding withdrawal of each coupling shaft from its recess. In the typical case where a sign is spaced apart horizontally from a wall, the coupling shafts are supported by their associated distal barrels even when the set screws are withdrawn. Accordingly, there is no need for any external support of the sign as the set screws are retracted.

The sign is removed from the wall without disturbing the connections of the proximal spacer members with the sign, and without disturbing the couplings of the distal spacer members with the wall. As to the latter couplings, the arrangement is particularly advantageous because it allows removal of the sign without destroying the silicone bonds.

Another feature of the invention resides in the removable attachment of the studs to their associated barrels. This allows a removal of the proximal barrels from the sign, and removal of the distal barrels from the wall, in each case without disturbing the connection of the associated stud. A spacer assembly barrel can be removed for cleaning or inspection, or can be replaced with a barrel of a different length to selectively adjust the spacing of the sign from the wall.

Figure 11:
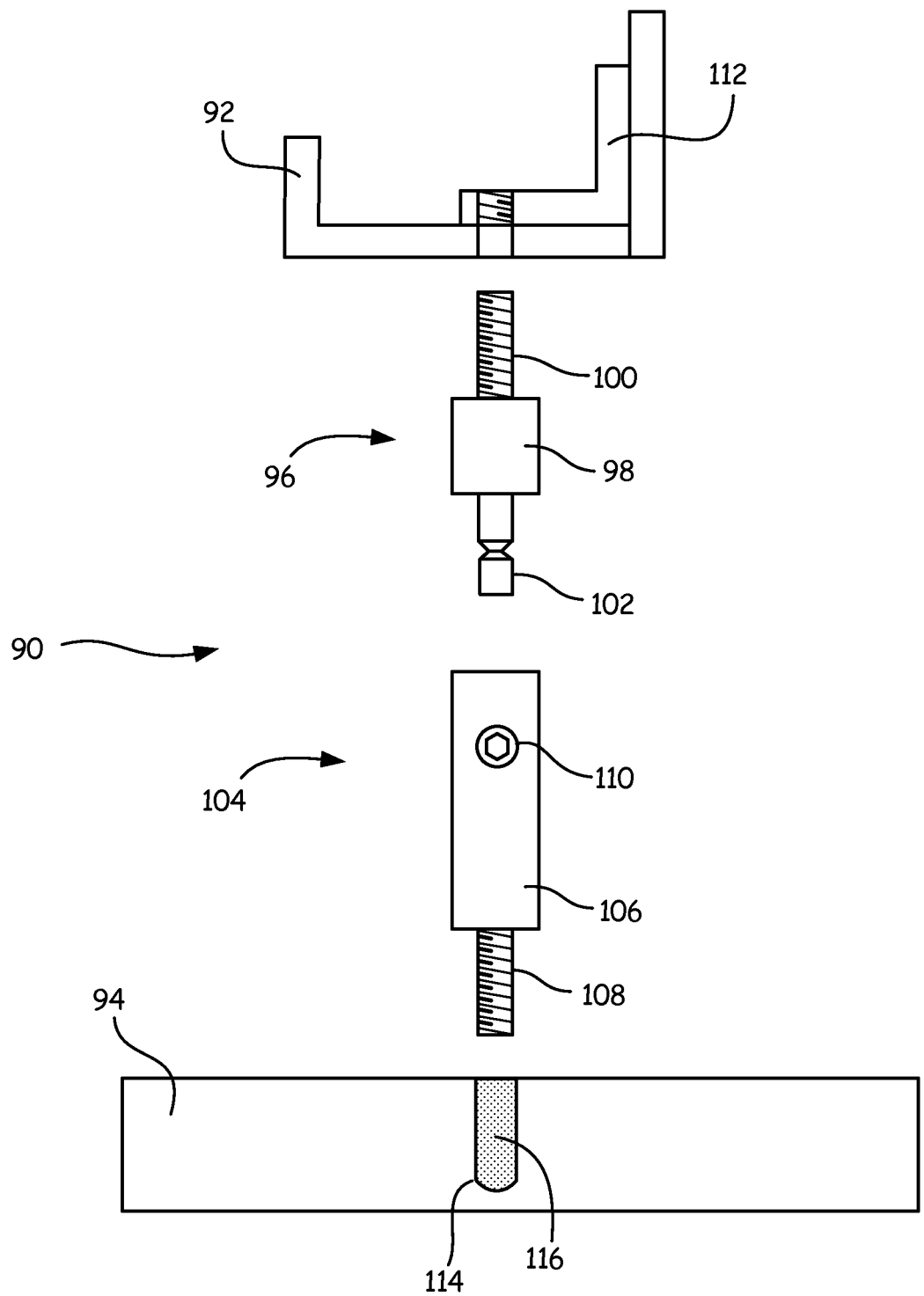
FIG. 11 is a side elevation showing one of several spacer assemblies supporting a display object in vertical spaced apart relation to a base.

FIG. 11 illustrates an alternative arrangement in which spacer assemblies, one of which is shown at 90, are employed to support a sign 92 in a desired vertical spacing from a horizontal base 94. A proximal spacer member 96 includes a barrel 98, a threaded stud 100 extended proximally from the barrel, and a coupling shaft 102 extended distally from barrel 98. A distal spacer member 104 includes a barrel 106 and a threaded stud 108 extending distally from the barrel. A set screw 110, mounted in an aperture formed in barrel 106, is advanced as before to engage the coupling shaft. As before, stud 100 is threaded into a bracket 112 of the sign, while stud 108 is mounted in a hole 114 filled with a silicone adhesive 116.

Thus in accordance with the present invention, a display object is supported at a desired spacing from a supporting object in a manner that allows convenient detachment and reattachment of the display object. Spacer assemblies, each including slidably coupled proximal and distal barrels and an anchoring stud attached to each barrel, cooperate to removably mount the display object to the supporting object. The spacer assemblies are parallel, so that distal movement of a properly aligned display object simultaneously couples opposed pairs of the barrels to mount the display object. Likewise, a mounted display object can be moved proximally to simultaneously disconnect the barrels, releasing it from the supporting object without removing the anchoring studs from either object. The mounting assemblies further can be configured with interchangeable parts to allow substitution of components to selectively increase or decrease the desired spacing.

What is claimed is:

1. An apparatus for mounting a display to a supporting object, said apparatus comprising:
   a first spacer member;
   a second spacer member;
   a coupling shaft that slidably and releasably secures together said first and second spacer members;
   said first spacer member, second spacer member and coupling shaft are coaxially aligned;

said first and second spacer members adapted to mount the display to the supporting object in a spaced apart relation when said first and second spacer members are aligned and engaged between the display and the supporting object; and a securing member adapted to engage and disengage said coupling shaft when said first and second spacer members are aligned and engaged between the display and the supporting member.

2. The apparatus as recited in claim 1 wherein said coupling shaft extends outwardly from a first end of said first spacer member in coaxial alignment with said second spacer members.

3. The apparatus as recited in claim 1, said securing member further including a set screw positioned in said second spacer member to secure said coupling shaft to said second spacer member.

4. The apparatus as recited in claim 1, wherein said first spacer member further includes a first stud to secure said first spacer member to the display, said first stud extending outwardly from said first spacer member in coaxial alignment with said coupling shaft.

5. The apparatus as recited in claim 4, wherein the display includes a threaded aperture in coaxial alignment with said first and second spacer members when the display is mounted to the supporting object.

6. The apparatus as recited in claim 1 wherein said second spacer member further includes a second stud to secure said second spacer member to the supporting object.

7. The apparatus as recited in claim 6, wherein the supporting object includes an aperture in coaxial alignment with said first and second spacer members when said display is mounted to said supporting object.

8. The apparatus as recited in claim 4 wherein said second spacer member further includes a second stud to secure said second spacer member to the supporting object.

9. The apparatus as recited in claim 8, wherein the supporting object includes an aperture in coaxial alignment with said first and second spacer members and said first and second studs when the display is mounted to the supporting object.

10. The apparatus as recited in claim 3, further including a groove formed in said coupling shaft to align and receive said set screw when said first and second spacer members are secured together.

11. The apparatus as recited in claim 1, wherein said first and second spacer members may be unsecured relative to the other.

12. An apparatus for mounting a display to a supporting object, said apparatus comprising:
a first spacer member;
a second spacer member;
a coupling shaft that slidably and releasably secures together said first and second spacer members, said coupling shaft extending outwardly from a first end of said first spacer member in coaxial alignment with said first and second spacer members;
a first stud to secure said first spacer member to the display, said first stud extending outwardly from said first spacer member in coaxial alignment with said coupling shaft;
a second stud to secure said second spacer member to the supporting object;
wherein said first and second spacer members secure together in a coaxial alignment;
said first and second spacer members adapted to mount the display to the supporting object in a spaced apart relation when said first and second spacer members are aligned and engaged between the display and the supporting object; and a securing member adapted to engage and disengage said coupling shaft when said first and second spacer members are aligned and engaged between the display and the supporting member.

13. The apparatus as recited in claim 12, said securing member further including a set screw positioned in said second spacer member to secure said coupling shaft to said second spacer member.

14. The apparatus as recited in claim 12, wherein said first stud includes threading and the display includes a threaded aperture in coaxial alignment with said first and second spacer members when the display is mounted to the supporting object.

15. The apparatus as recited in claim 12, wherein said second stud includes threading and the supporting object includes an oversized aperture in coaxial alignment with said first and second spacer members when the display is mounted to the supporting object.

16. The apparatus as recited in claim 13, further including a groove formed in said coupling shaft to align and receive said set screw when said first and second spacer members are aligned and engaged together.

17. An apparatus for mounting a display to a supporting object, said apparatus comprising:
a first spacer member having a coupling shaft extending outwardly from a first end of said first spacer member and having a first anchor member extending outwardly from an opposing second end of said first spacer member, said first spacer member, coupling shaft, and first anchor member having coaxial alignment;
a second spacer member having a shaft receiving bore formed and extending into said second spacer member from a first end of said second spacer member and having a second anchor member extending outwardly from a second end of said second spacer member, said second spacer member, the bore and said second anchor member having coaxial alignment;
said coupling shaft sized to fit within said bore and adapted to slidably and releasably secure together said first and second spacer members in coaxial alignment;
said first anchor adapted to secure said first spacer member to the display and said second anchor adapted to secure said second spacer member to the supporting object; and
said first and second spacer members are adapted to secure together with a set screw and said set screw is adapted to be accessible from an external portion of said display after the display is mounted to the supporting object in a spaced apart relation.

18. The apparatus as recited in claim 17, wherein said first anchor includes threading and the display includes a threaded aperture adapted to receive said first anchor in coaxial alignment with said first and second spacer members when the display is mounted to the supporting object.

19. The apparatus as recited in claim 17, wherein said second anchor includes threading and the supporting object includes an aperture in coaxial alignment with said first and second spacer members when the display is mounted to the supporting object.

20. The apparatus as recited in claim 17, further including a groove formed onto said shaft to align and receive said set screw when said first and second spacer members are secured together.

* * * * *